United States Patent
Novotny et al.

(10) Patent No.: US 11,334,386 B2
(45) Date of Patent: May 17, 2022

(54) METHOD OF SCHEDULING AN ADDITIONAL NEW PROCESSING TASK TO BE EXECUTED BY A PROCESSOR, SCHEDULER, AND CENTRAL PROCESSING UNIT

(71) Applicant: Unify Patente GmbH & Co. KG, Munich (DE)

(72) Inventors: Pavel Novotny, Brno (CZ); Gerd Dieter Spahl, Puchheim (DE)

(73) Assignee: Unify Patente GmbH & Co. KG, Munich (DE)

( * ) Notice: Subject to any disclaimer, the term of this patent is extended or adjusted under 35 U.S.C. 154(b) by 0 days.

(21) Appl. No.: 17/065,561

(22) Filed: Oct. 8, 2020

(65) Prior Publication Data

US 2021/0109784 A1 Apr. 15, 2021

(30) Foreign Application Priority Data

Oct. 11, 2019 (EP) ..................... 19202853

(51) Int. Cl.
   *G06F 9/46* (2006.01)
   *G06F 9/48* (2006.01)
   *G06F 9/50* (2006.01)
   *G06F 11/34* (2006.01)

(52) U.S. Cl.
   CPC ............ *G06F 9/4887* (2013.01); *G06F 9/505* (2013.01); *G06F 9/5038* (2013.01); *G06F 11/3433* (2013.01)

(58) Field of Classification Search
   CPC ...... G06F 9/4887; G06F 9/5038; G06F 9/505; G06F 11/3433
   See application file for complete search history.

(56) References Cited

U.S. PATENT DOCUMENTS

| 6,237,058 B1 | 5/2001 | Nakagawa |
| 6,859,460 B1 | 2/2005 | Chen |
| 7,062,768 B2 | 6/2006 | Kubo et al. |
| 7,254,812 B1 | 8/2007 | Menezes |

(Continued)

FOREIGN PATENT DOCUMENTS

| EP | 3011692 B1 | 6/2017 |
| WO | 2004090683 A2 | 10/2004 |
| WO | 2018050242 A1 | 3/2018 |

OTHER PUBLICATIONS

European Search Report for European Application No. 19202853.8 dated Apr. 30, 2020.

*Primary Examiner* — Gregory A Kessler
(74) *Attorney, Agent, or Firm* — Buchanan Ingersoll & Rooney PC

(57) ABSTRACT

A method of scheduling an additional new processing task to be executed by a processor which is already executing a predetermined number of processing tasks to be executed within timeslots and in a periodic sequence of timeslots by the processor can include determining the periodicity of execution of each processing task, associating the performance consumption with each processing task, and scheduling the additional new processing task to be executed in a periodic sequence of timeslots so as to satisfy a predetermined performance consumption criterion. Further, the present invention relates to a communication system, computer device, scheduler and a Central Processing Unit (CPU) with a scheduler.

19 Claims, 2 Drawing Sheets

(56) References Cited

U.S. PATENT DOCUMENTS

| | | |
|---|---|---|
| 8,111,720 B2 | 2/2012 | Synnergren |
| 2012/0331474 A1 | 12/2012 | Suzuki et al. |
| 2015/0372931 A1 | 12/2015 | Puleri et al. |
| 2017/0026298 A1 | 1/2017 | Huo et al. |
| 2019/0243686 A1* | 8/2019 | LaBute .................. G06F 9/505 |

* cited by examiner

METHOD OF SCHEDULING AN ADDITIONAL NEW PROCESSING TASK TO BE EXECUTED BY A PROCESSOR, SCHEDULER, AND CENTRAL PROCESSING UNIT

CROSS-REFERENCE TO RELATED APPLICATIONS

The present application claims priority to European Patent Application No. 19202853.8, which was filed on Oct. 11, 2019. The entirety of this European patent application is incorporated by reference herein.

FIELD

The present invention relates to a method of scheduling an additional new processing task to be executed by a processor, a communication system, a computer device, a scheduler, and a Central Processing Unit (CPU).

BACKGROUND

Algorithms in real time systems for media processing are typically invoked regularly in defined time intervals. The period between the processing is constant and is influenced by several factors, as data packet length, type of used codec, jitter buffer size, etc. Typically, the processing algorithm is consuming high performance for a short time period in the processor.

SUMMARY

We have determined that a problem which can occur in the above mentioned media processing case is the potential overload of the processing unit that can result if processing tasks are accumulated in a short timeframe, whereas for the rest of the time, the processing unit idling. Also, the total sum of necessary performance is below the computing power of the processing unit, but however, the performance is not available when needed in the above described scenario according to the prior art.

Therefore, the present invention is based on the object to provide a method of scheduling an additional new processing task to be executed by a processor, a communication system, a computer device, a scheduler, and a Central Processing Unit (CPU), according to which processing peaks can be avoided or at least lowered so as to avoid accumulation and, thus, packet delay.

In some embodiments, a method of scheduling an additional new processing task to be executed by a processor (e.g. a processor of a computer device or a processor of a server of a communication system) which is already executing a predetermined number of processing tasks, wherein each running processing task is to be executed within a timeslot and in a periodic sequence of timeslots by the processor, and wherein each processing task causes a predetermined performance consumption when being executed by the processor, wherein the method comprises the steps of determining the periodicity of execution of each processing task, associating the performance consumption with each processing task, scheduling the additional new processing task to be executed in a periodic sequence of timeslots so as to satisfy a predetermined performance consumption criterion.

The processor can be a hardware element of a computer device (e.g. a server, a workstation, etc.). For instance, the processor can be a microprocessor, a core processor, a processing unit that includes multiple interconnected processors, or other type of processor hardware device.

In some embodiments of the method, the new incoming tasks or the respective data packets can be scheduled so that load peaks are prevented or at least minimized, since the scheduling can assign the new processing task to timeslots which preferably are not used or which at least have a very low load. Thus, an evenly distribution of packets on computing time-slots to be processed can be achieved, which can avoid accumulation and, thus, packet delay. Namely, the execution of the processing algorithm can be scheduled in order to distribute the load in the time and thereby, prevent peaks in performance consumption.

It is noted that the performance consumption is determined by the used algorithm, e.g. the type of encoder/decoder, associated detection algorithm or applied filters. According to a preferred embodiment, the predetermined performance consumption criterion is finding the timeslots which are not yet consumed by the processing of the running processing tasks at all, or which are consumed least by the processing of the running processing tasks. According to another preferred embodiment, the predetermined performance consumption criterion is minimizing the highest load in each timeslot.

Preferably, the scheduling is carried out such that an initial starting timeslot for invoking the additional new processing task as well as the recurring timeslots in the periodic sequence both are assigned to the timeslots that satisfy the predetermined consumption criterion.

According to still another preferred embodiment, the selection of the initial starting timeslot is based on the packet length of data packets received for the additional new processing task, and on a calculated performance consumption for all timeslots in which the additional new processing task will be invoked It can also be advantageous, if for selecting the initial starting timeslot, a step of determining the timeslots with most available resources is carried out, wherein the determination is based on the number of the running and scheduled processing tasks, and the computation demand of the scheduled and running processing tasks.

The method further may comprise a step of registering all running and scheduled processing tasks.

Also, according to yet another preferred embodiment of the invention, the data packets are part of a media stream.

In some embodiments, it can be particularly preferred, if the processing of the processing tasks is carried out in a single processor architecture, which have the advantage of low costs, but for which the load cannot be distributed across several processors or where many media streams are handled by only a few CPUs like for our STMIX-board where 120 channels are served by only four CPU cores.

Moreover, preferably, the method is carried out on a media processing system that plans the additional new processing task with a granularity of 1 ms. Of course, the method can be performed by other types of devices or systems having a different type of processing task granularity.

Further, the method may comprise a step of accessing, for the selection of the initial starting timeslot of the additional new task, a table, in which the running processing tasks which are being executed are stored for each timeslot and are associated with a respective performance coefficient representing the performance consumption for each one of the scheduled and running processing tasks.

According to another preferred embodiment, the total performance consumption for the timeslots used for processing the running processing tasks and the additional new processing task is calculated using the performance coefficients.

Moreover, according to the present invention, a scheduler for a Central Processing Unit, CPU, is provided, wherein the scheduler is adapted to carry out the method of scheduling an additional new processing task, as described above.

Also, according to the present invention, a Central Processing Unit, CPU, is provided with a scheduler which is adapted to carry out an embodiment of our method of scheduling an additional new processing task, as described herein. Other embodiments include a computer device and a communication system that are configured and adapted to utilize an embodiment of our method.

Other details, objects, and advantages of the invention will become apparent as the following description of certain exemplary embodiments thereof and certain exemplary methods of practicing the same proceeds.

BRIEF DESCRIPTION OF THE DRAWINGS

The invention and embodiments thereof will be described below in further detail in connection with the drawings.

DETAILED DESCRIPTION

Figure 1:
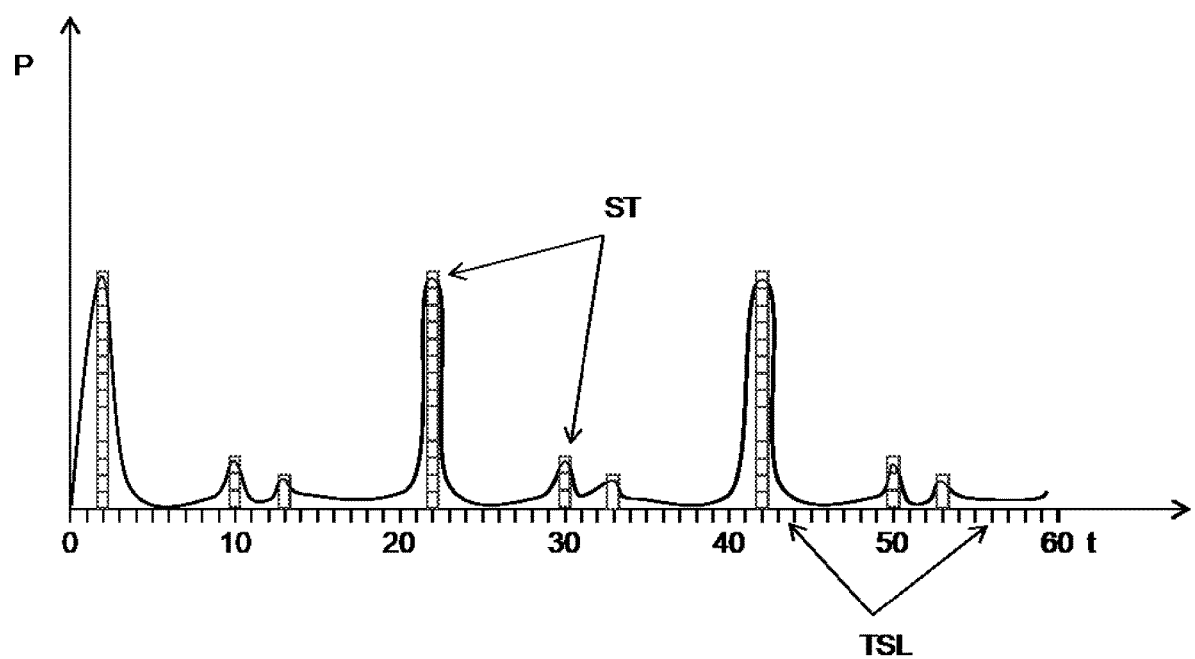
FIG. 1 is a diagram for the processing unit load according to a scheduling procedure according to prior art.

FIG. 1 shows a diagram for the processing unit load according to a scheduling procedure according to prior art. In the diagram of FIG. 1, the performance P needed by each task in recurring timeslots TSL is plotted against the time t in milliseconds (ms). As can be seen from FIG. 1, there are several peaks at specific timeslots ST, where several tasks are to be processed in the same timeslot. For example, a high peak which represents a high load of the processor can be recognized at 2 ms, 22, ms, and 42 ms, and some smaller peaks can be seen at 10 ms, 30 ms, and 50 ms, and at 13 ms, 33 ms, and 53 ms. Inbetween the respective peaks, no processing takes place at no load time slots such that the processor utilizing this prior art scheduling procedure is in an idling state and not used at those times. This is a disadvantageous situation that we identified, as already described above.

Figure 2:
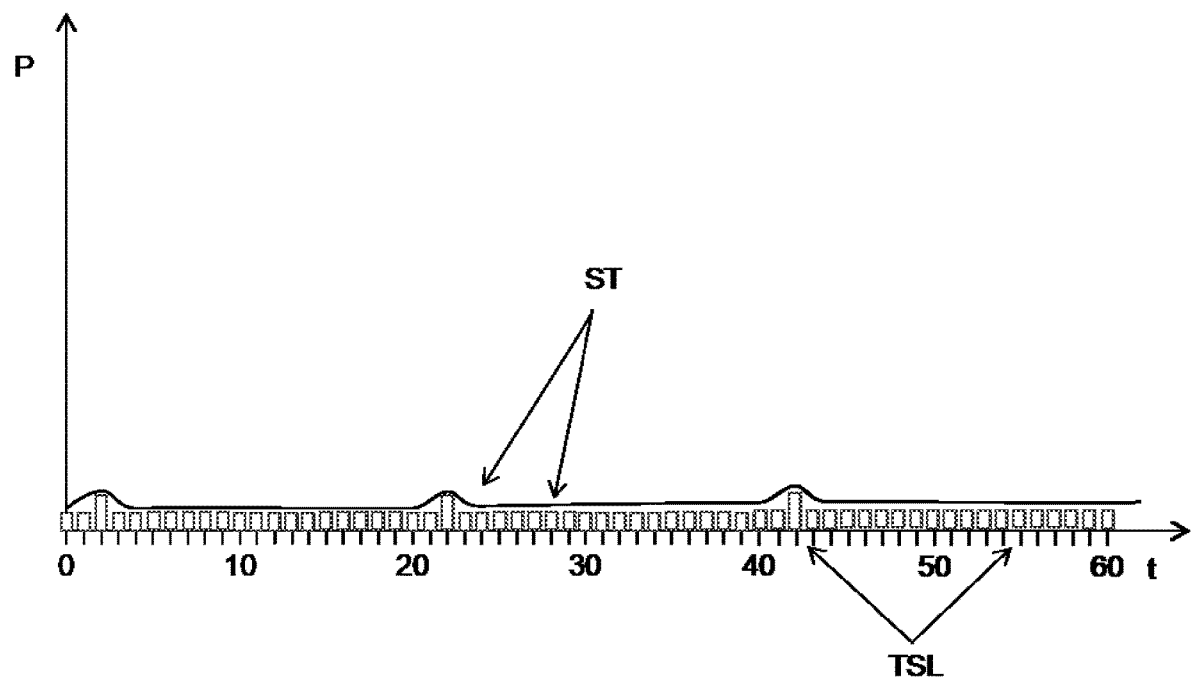
FIG. 2 is a diagram for the processing unit load using a scheduling procedure according to an embodiment of the invention.

FIG. 2 shows another diagram for the processing unit load using a scheduling procedure according to an embodiment of the invention. As can be recognized, here, the optimal timeslots are determined and assigned to incoming and running tasks which periodically require CPU resources. It is noted that a distribution over several processors (if more are available) may be accomplished additionally by the operating system.

The execution of the processing algorithm according to an embodiment of the invention is scheduled in order to distribute the load over time so as to prevent the peaks in performance consumption, i.e. performance needed for the task to be executed by the processor in predetermined recurring timeslots. The scheduling considers the following aspects:

the number of already running and scheduled processing tasks, and the computation demand of the scheduled processing tasks.

The scheduler according to an embodiment of the invention works with a table in which the following information is stored for each available timeslot processing task Tx, and coefficient representing the performance consumption for the scheduled task Cx.

The optimal timeslot, to which the new task Tnew is assigned, is selected according the calculated performance consumption for all timeslots in which the new additional task will be invoked. The timeslot with the highest available capacity, i.e., the one which is least busy (with minimal needed performance) is preferred.

Figure 3:
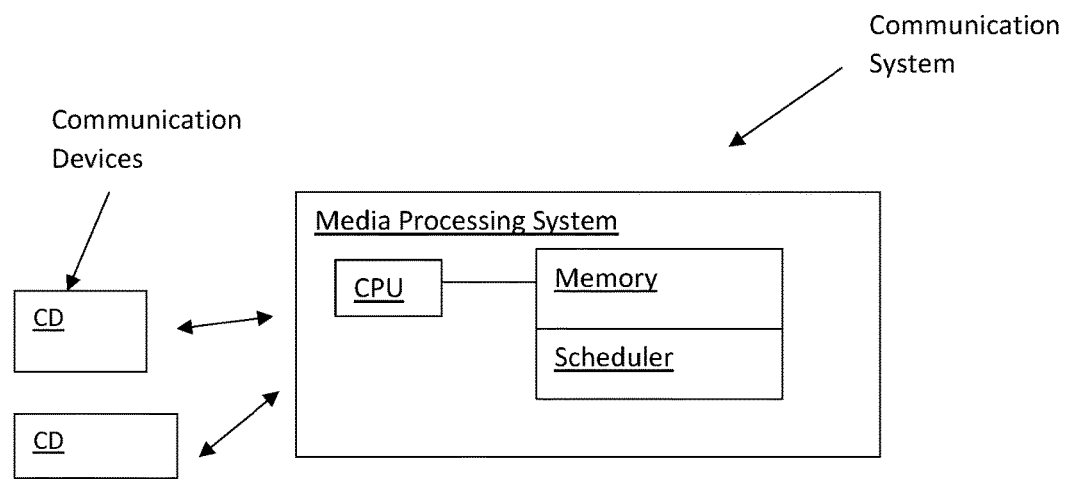
FIG. 3 is a block diagram illustrating an exemplary communication system that can utilize an embodiment of the processing load scheduling procedure.

As may be appreciated from FIG. 3, the media processing system in which the CPU executes the processing tasks, preferably related to media streams, may plan the task/tasks with a granularity of 1 ms or some other pre-specified granularity. In the following example described below, several intervals between consequent packets (for sending and receiving).) of 10 ms, 20 ms and 30 ms are considered for a media processing system processing data packets from media streams it may receive from communication devices CD of a communication system for processing those data packets according to a pre-selected load processing schedule. The communication devices can be laptop computers, desktop computers, tablets, smart phones, or other types of computer devices that include a processor, memory, and at least one transceiver. The load processing schedule used by the media processing system may be defined by a scheduler. The scheduler can be a program or application defined by code that is stored in the memory of the media processing system that is communicatively connected to the CPU so that the CPU can run the scheduler. The media processing system can be computer device, a server, or a group of servers in some embodiments of the media processing system. The CPU of the media processing system can be a processor, an interconnected group of processors, or other type of processor element. The memory can be a non-transitory computer readable medium (e.g. flash memory, a hard drive, a solid state driver, etc.).

The respective processing tasks in the below exemplary example of the scheduling process are indicated by T1, T2 and T3, respectively, and their respective performance coefficients are indicated by C1, C2, and C3, or Cx, respectively, wherein x stands for task identification. In the table below, to which the scheduler of the media processing system can refer when scheduling new additional processing tasks, for every timeslot, the respective running processing task or tasks is/are listed together with its/their respective total performance consumption.

TABLE 1

Exemplary scheduling process

| Timeslot [ms] | Running tasks | Total performance consumption |
|---|---|---|
| 0 | T1 + T2 + T3 | C1 + C2 + C3 |
| 1 | ... | ... |
| ... | ... | ... |
| 10 | T1 | C1 |
| 11 | ... | ... |
| ... | ... | ... |
| 20 | T1 + T2 | C1 + C2 |

TABLE 1-continued

Exemplary scheduling process

| Timeslot [ms] | Running tasks | Total performance consumption |
|---|---|---|
| 21 | ... | ... |
| ... | ... | ... |
| 30 | T1 + T3 | C1 + C3 |
| 31 | ... | ... |
| ... | ... | ... |
| 40 | T1 + T2 | C1 + C2 |
| 41 | ... | ... |
| ... | ... | ... |
| 50 | T1 | C1 |
| 51 | ... | ... |
| ... | ... | ... |
| 59 | ... | ... |

The total performance consumption for the relevant timeslots can be calculated with the use of the performance coefficients for each processing task. For a packet length or write packet interval N, all timeslots TS mod N are relevant.

In the following example, a new timeslot should be found and scheduled for a new additional processing task, Tnew, which needs an initial starting timeslot and a predetermined number of periodically recurring timeslots, and which is processing 20 ms of media data or a media stream. Thus, the timeslots available with an offset of 20 ms will be evaluated. The timeslots at 0 ms, 20 ms, and 40 ms are checked, and the available resources are calculated, which are not yet consumed by already running processing tasks.

According to a first approach, which represents a first predetermined performance consumption criterion, the timeslots for the new additional processing task, Tnew, with most available resources are searched for and found accordingly using the formula given below:

$$Tnew = \min((\Sigma Cn0 + \Sigma Cn20 + Cn40), (\Sigma Cn01 + \Sigma Cn21 + Cn41), \ldots, (\Sigma Cn19 + \Sigma Cn39 + \Sigma Cn59))$$

wherein $\Sigma Cn0$ stands for the sum of coefficients for tasks scheduled in timeslot 0 (and respectively $\Sigma Cn20$, $\Sigma Cn40$ for timeslots 20, 40, etc.).

According to a second approach, which represents a second predetermined performance consumption criterion, the highest load is minimized in each timeslot. In this case, the goal is to keep the load in each timeslot as low as possible. Therefore, also the performance needed for the new task Tnew represented by the coefficient Cnew is considered. Thus, the new timeslot, Tnew, for the new additional processing task is calculated according to the formula below:

$$Tnew = \min(\max(\Sigma Cn0 + Cnew, \Sigma Cn20 + Cnew, \Sigma Cn40 + Cnew), \max(\Sigma Cn01 + Cnew, \Sigma Cn21 + Cnew, \Sigma Cn41 + Cnew), \ldots, \max(\Sigma Cn19 + Cnew, \Sigma Cn39 + Cnew, \Sigma Cn59 + Cnew))$$

Summarizing the above embodiments, instead of distributing processing tasks to different processors as they arrive, according to embodiments of the present invention, the optimal timeslot for tasks which periodically need CPU resources can be determined, as outlined above. According to the scheduling procedures outlined above, the load can be distributed evenly over time to available (i.e., "free") timeslots or timeslots which still have a high capacity for executing tasks. Load peaks and idle times in the processing unit may thus be efficiently prevented or at least minimized.

While certain exemplary embodiments of apparatuses, networks, communication platforms, CPUs, schedulers, media processing systems, and communication systems and methods of making and using the same have been discussed and illustrated herein, it is to be distinctly understood that the invention is not limited thereto but may be otherwise variously embodied and practiced within the scope of the following claims.

What is claimed is:

1. A method of scheduling an additional new processing task to be executed by a processor which is already executing a predetermined number of processing tasks, wherein each running processing task is to be executed within a timeslot and in a periodic sequence of timeslots by the processor, and wherein each processing task causes a predetermined performance consumption when being executed by the processor, wherein the method comprises:
   determining the periodicity of execution of each processing task,
   associating the performance consumption with each processing task,
   scheduling the additional new processing task to be executed in a periodic sequence of timeslots so as to satisfy a predetermined performance consumption criterion, wherein the predetermined performance consumption criterion is minimizing the highest load in each timeslot; and
   wherein the selection of the initial starting timeslot is based on a packet length of data packets received for the additional new processing task, and on a calculated performance consumption for all timeslots in which the additional new processing task will be invoked.

2. The method according to claim 1, wherein for selecting the initial starting timeslot, a step of determining the timeslots with most available resources is carried out, wherein the determination is based on the number of the running and scheduled processing tasks, and the computation demand of the scheduled and running processing tasks.

3. The method of claim 2, wherein the method further comprises a step of registering all running and scheduled processing tasks.

4. The method of claim 1, wherein the data packets are part of a media stream.

5. A method of scheduling an additional new processing task to be executed by a processor which is already executing a predetermined number of processing tasks, wherein each running processing task is to be executed within a timeslot and in a periodic sequence of timeslots by the processor, and wherein each processing task causes a predetermined performance consumption when being executed by the processor, wherein the method comprises:
   determining the periodicity of execution of each processing task,
   associating the performance consumption with each processing task,
   scheduling the additional new processing task to be executed in a periodic sequence of timeslots so as to satisfy a predetermined performance consumption criterion; and
   accessing, for the selection of the initial starting timeslot of the additional new task, a table, in which the running processing tasks which are being executed are stored for each timeslot and are associated with a respective performance coefficient representing the performance consumption for each one of the scheduled and running processing tasks.

6. The method of claim 5, wherein the predetermined performance consumption criterion is finding the timeslots which are not yet consumed by the processing of the running processing tasks at all, or which are consumed least by the processing of the running processing tasks.

7. The method of claim 5, wherein the predetermined performance consumption criterion is minimizing the highest load in each timeslot.

8. The method according to claim 7, wherein the scheduling is carried out such that an initial starting timeslot for invoking the additional new processing task as well as the recurring timeslots in the periodic sequence both are assigned to the timeslots that satisfy the predetermined consumption criterion.

9. The method according to claim 6, wherein the scheduling is carried out such that an initial starting timeslot for invoking the additional new processing task as well as the recurring timeslots in the periodic sequence both are assigned to the timeslots that satisfy the predetermined consumption criterion.

10. The method of claim 5, wherein the processing of the processing tasks is carried out in a single processor architecture.

11. The method of claim 5, wherein the method is carried out on a media processing system that plans the additional new processing task with a granularity of 1 ms.

12. The method according to claim 5, wherein the total performance consumption for the timeslots used for processing the running processing tasks and the additional new processing task is calculated using the performance coefficients.

13. A non-transitory computer-readable medium having code stored thereon that defines a method when a processor executes the code, the method comprising:
   determining the periodicity of execution of each processing task for scheduling an additional new processing task to be executed by the processor which is already executing a predetermined number of processing tasks, wherein each running processing task is to be executed within a timeslot and in a periodic sequence of timeslots by the processor, and wherein each processing task causes a predetermined performance consumption when being executed by the processor;
   associating the performance consumption with each processing task, and
   scheduling the additional new processing task to be executed in a periodic sequence of timeslots so as to satisfy a predetermined performance consumption criterion, wherein the predetermined performance consumption criterion is minimizing the highest load in each timeslot; and
   wherein the selection of the initial starting timeslot is based on the packet length of data packets received for the additional new processing task and on a calculated performance consumption for all timeslots in which the additional new processing task will be invoked.

14. The non-transitory computer-readable medium of claim 13, wherein the code defines a scheduler for a central processing unit (CPU), the processor being the CPU.

15. A media processing system comprising:
   a processor;
   a non-transitory computer-readable medium communicatively connectable to the processor, the non-transitory computer-readable medium having code stored thereon that defines a method when the processor executes the code, the method comprising:
   determining the periodicity of execution of each processing task for scheduling an additional new processing task to be executed by the processor which is already executing a predetermined number of processing tasks, wherein each running processing task is to be executed within a timeslot and in a periodic sequence of timeslots by the processor, and wherein each processing task causes a predetermined performance consumption when being executed by the processor;
   associating the performance consumption with each processing task, and
   scheduling the additional new processing task to be executed in a periodic sequence of timeslots so as to satisfy a predetermined performance consumption criterion, wherein the predetermined performance consumption criterion is defined so that a highest load is minimized in each of the timeslots to keep the load in all the timeslots as low as possible; and
   wherein the selection of the initial starting timeslot is based on a packet length of data packets received for the additional new processing task and on a calculated performance consumption for all timeslots in which the additional new processing task will be invoked.

16. The media processing system of claim 15, wherein the predetermined performance consumption criterion is defined so that a timeslot with a highest amount of available resources are searched for and found for scheduling the new processing task to that timeslot.

17. The media processing system of claim 15, wherein the data packets are part of a media stream.

18. A media processing system comprising:
   a processor;
   a non-transitory computer-readable medium communicatively connectable to the processor, the non-transitory computer-readable medium having code stored thereon that defines a method when the processor executes the code, the method comprising:
   determining the periodicity of execution of each processing task for scheduling an additional new processing task to be executed by the processor which is already executing a predetermined number of processing tasks, wherein each running processing task is to be executed within a timeslot and in a periodic sequence of timeslots by the processor, and wherein each processing task causes a predetermined performance consumption when being executed by the processor;
   associating the performance consumption with each processing task,
   scheduling the additional new processing task to be executed in a periodic sequence of timeslots so as to satisfy a predetermined performance consumption criterion, and
   accessing, for the selection of the initial starting timeslot of the additional new task, a table, in which the running processing tasks which are being executed are stored for each timeslot and are associated with a respective performance coefficient representing the performance consumption for each one of the scheduled and running processing tasks.

19. A non-transitory computer-readable medium having code stored thereon that defines a method when a processor executes the code, the method comprising:
   determining the periodicity of execution of each processing task for scheduling an additional new processing task to be executed by the processor which is already executing a predetermined number of processing tasks, wherein each running processing task is to be executed within a timeslot and in a periodic sequence of timeslots by the processor, and wherein each processing task causes a predetermined performance consumption when being executed by the processor;

associating the performance consumption with each processing task, scheduling the additional new processing task to be executed in a periodic sequence of timeslots so as to satisfy a predetermined performance consumption criterion, and accessing, for the selection of the initial starting timeslot of the additional new task, a table, in which the running processing tasks which are being executed are stored for each timeslot and are associated with a respective performance coefficient representing the performance consumption for each one of the scheduled and running processing tasks.

\* \* \* \* \*